(12) United States Patent
Bruno (10) Patent No.: US 10,343,873 B2
(45) Date of Patent: Jul. 9, 2019

(54) ISSUE REPORTING FOR ELEVATOR SYSTEMS

(71) Applicant: Otis Elevator Company, Farmington, CT (US)

(72) Inventor: Gilles Bruno, Chateauneuf sur Loire (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 80 days.

(21) Appl. No.: 15/470,071

(22) Filed: Mar. 27, 2017

(65) Prior Publication Data

US 2017/0297865 A1    Oct. 19, 2017

(30) Foreign Application Priority Data

Apr. 15, 2016    (EP) .................................... 16305439

(51) Int. Cl.
| | | |
|---|---|---|
| *B66B 1/34* | (2006.01) | |
| *B66B 3/00* | (2006.01) | |
| *B66B 5/00* | (2006.01) | |
| *B66B 1/52* | (2006.01) | |
| *H04L 29/08* | (2006.01) | |

(52) U.S. Cl.
CPC .................. *B66B 5/00* (2013.01); *B66B 1/52* (2013.01); *B66B 3/00* (2013.01); *B66B 5/0006* (2013.01); *B66B 5/0025* (2013.01); *B66B 2201/4646* (2013.01); *H04L 67/12* (2013.01)

(58) Field of Classification Search
CPC .... B66B 5/00; B66B 1/52; B66B 3/00; B66B 5/0025; B66B 5/0006; B66B 2201/4646; H04L 67/12

USPC ......................................................... 187/391
See application file for complete search history.

(56) References Cited

U.S. PATENT DOCUMENTS

| | | |
|---|---|---|
| 6,304,257 B1 | 10/2001 | Viskari |
| 7,073,633 B2 | 7/2006 | Weinberger et al. |
| 7,789,204 B2 | 9/2010 | Masaaki |

(Continued)

FOREIGN PATENT DOCUMENTS

| | | |
|---|---|---|
| JP | H0445082 | 2/1992 |
| JP | 2009190874 | 8/2009 |

(Continued)

OTHER PUBLICATIONS

European Search Report, European Application No. 16305439.8, dated Nov. 3, 2016, European Patent Office; European Search Report 9 pages.

(Continued)

*Primary Examiner* — Jeffrey Donels
(74) *Attorney, Agent, or Firm* — Cantor Colburn LLP (57) ABSTRACT

Methods and systems for reporting issues in an elevator system are provided. The reporting system includes a display located within an elevator car, an input device configured to receive input from a passenger within the elevator car, and a computing system having a processor and a memory, the computing system configured to generate a user interface on the display and configured to receive input from the input device, wherein the memory includes a list of possible issues related to the elevator car. The computing system is configured to generate a user report based on the received input, and transmit the user report to a remote location.

8 Claims, 5 Drawing Sheets

(56) References Cited

U.S. PATENT DOCUMENTS

| | | |
|---|---|---|
| 8,069,958 B2 | 12/2011 | Lence-Barreiro |
| 10,035,679 B2 * | 7/2018 | Armistead ................ B66B 1/46 |
| 2007/0203712 A1 | 8/2007 | Sunday et al. |
| 2012/0097488 A1 * | 4/2012 | Taiana .................... B66B 1/468 187/395 |
| 2013/0246286 A1 | 9/2013 | Welty et al. |
| 2015/0039157 A1 | 2/2015 | Wolfe et al. |
| 2015/0274486 A1 | 10/2015 | Wilke et al. |
| 2015/0284214 A1 | 10/2015 | Park et al. |

FOREIGN PATENT DOCUMENTS

| | | | |
|---|---|---|---|
| JP | 2009190874 A | * | 8/2009 |
| JP | 2013023325 A | * | 2/2013 |
| JP | 2013023325 A | | 2/2013 |
| KR | 20070091263 A | | 9/2007 |
| WO | 2012065360 A1 | | 5/2012 |

OTHER PUBLICATIONS

Gray; "Elevator Service—Preventive or Predictive"; WIPRO Technologies; 2013; URL; Internet: https://www.wipro.com/documents/elevator service; 8 pgs.

McGar; "Smart Elevators and the Internet of Things"; 2015; Internet; URL: https://smart-elevators-and-the-internet-of-things; 6 pgs.

Schiff; Precision Measurement Instruments; May 2016; Internet; URL: https://hazards.colorado.edu/shakeout/elevators; 4 pgs.

Vasudevan; "Remote Maintenance of Escalators and Elevators Using Log Analytics"; Glassbeam; 2016; Internet; URL: http://www.glassbeam.com/blog/remote-maintenance-escalators-and-elevators-using-a-log-analytics; 3 pgs.

* cited by examiner

ISSUE REPORTING FOR ELEVATOR SYSTEMS

CROSS-REFERENCE TO RELATED APPLICATIONS

The present application claims priority from European Patent Application No. 16305439.8, filed Apr. 15, 2016. The contents of the priority application are hereby incorporated by reference in their entirety.

BACKGROUND

The subject matter disclosed herein generally relates to elevator systems and, more particularly, to issue reporting for elevator systems.

Elevator systems require maintenance and/or inspection to ensure that proper operation of the elevator system is maintained. A technician may be required to make calls or visits to the elevator systems and inspect the elevators, the elevator cars, and the other components of the elevator systems to ensure that they are in working order. It takes time and effort for a technician to visit every elevator system that is maintained by the technician. Further, issues can arise shortly after an inspection, and these issues may not be observed by a technician for a time (e.g., until the next time the technician makes an inspection visit).

One solution to this is to encourage passengers within the elevator to contact the technician such that a repair, replacement, inspection, etc., can be performed in a timely manner from when the issue is first observed. Current solutions for this include posting a phone number (or website) in or near the elevator and the passenger will notice the phone number and then make a call to the technician. Improved means for issue reporting are thus desirable.

SUMMARY

According to one embodiment, a reporting system for an elevator system is provided. The reporting system includes a display located within an elevator car, an input device configured to receive input from a passenger within the elevator car, and a computing system having a processor and a memory, the computing system configured to generate a user interface on the display and configured to receive input from the input device, wherein the memory includes a list of possible issues related to the elevator car. The computing system is configured to generate a user report based on the received input and transmit the user report to a remote location.

In addition to one or more of the features described above, or as an alternative, further embodiments of the reporting system may include that the display and the input device are a single device that is a touchscreen display.

In addition to one or more of the features described above, or as an alternative, further embodiments of the reporting system may include that the input device is the control buttons of the elevator car.

In addition to one or more of the features described above, or as an alternative, further embodiments of the reporting system may include that the input device is a microphone configured to receive voice commands from the passenger.

In addition to one or more of the features described above, or as an alternative, further embodiments of the reporting system may include that the user report includes at least one selected issue and information related to the elevator car.

In addition to one or more of the features described above, or as an alternative, further embodiments of the reporting system may include that the computing system is configured to determine if the generated user report is relevant.

In addition to one or more of the features described above, or as an alternative, further embodiments of the reporting system may include that the user report is transmitted only when it is determined that the user report is relevant.

In addition to one or more of the features described above, or as an alternative, further embodiments of the reporting system may include that the user report is relevant when it meets at least one predefined criteria.

In addition to one or more of the features described above, or as an alternative, further embodiments of the reporting system may include that the predefined criteria comprises at least one of a time of day, a day of the week, or a number of similar user reports.

According to another embodiment, a method of reporting an issue with an elevator is provided. The method includes generating a user interface within an elevator car, receiving input through an input device within the elevator car, generating a user report based on the received input, and transmitting the user report to a remote location.

In addition to one or more of the features described above, or as an alternative, further embodiments of the method may include that the user interface and the input device are a single device.

In addition to one or more of the features described above, or as an alternative, further embodiments of the method may include displaying one or more possible issues on the user interface to be selected by a passenger in the elevator car, the input including at least one of the one or more possible issues.

In addition to one or more of the features described above, or as an alternative, further embodiments of the method may include that the user report includes information related to the input and information related to the elevator car.

In addition to one or more of the features described above, or as an alternative, further embodiments of the method may include comparing the generated user report to criteria to determine if the generated user report is relevant, wherein if the user report is relevant, the user report is transmitted.

In addition to one or more of the features described above, or as an alternative, further embodiments of the method may include that the user report is relevant if (i) the user report is generated during a predefined period during a day, (ii) the user report is generated during a specific day of the week, or (iii) the user report matches at least one other user report generated during a predetermined period of time.

Technical effects of embodiments of the present disclosure include a reporting system for an elevator system that is configured to enable passengers to report observed issues directly to a maintenance facility or other remote location. Further technical effects include providing menus and submenus or options such that a specific maintenance issue may be selected and reported by a passenger.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1:
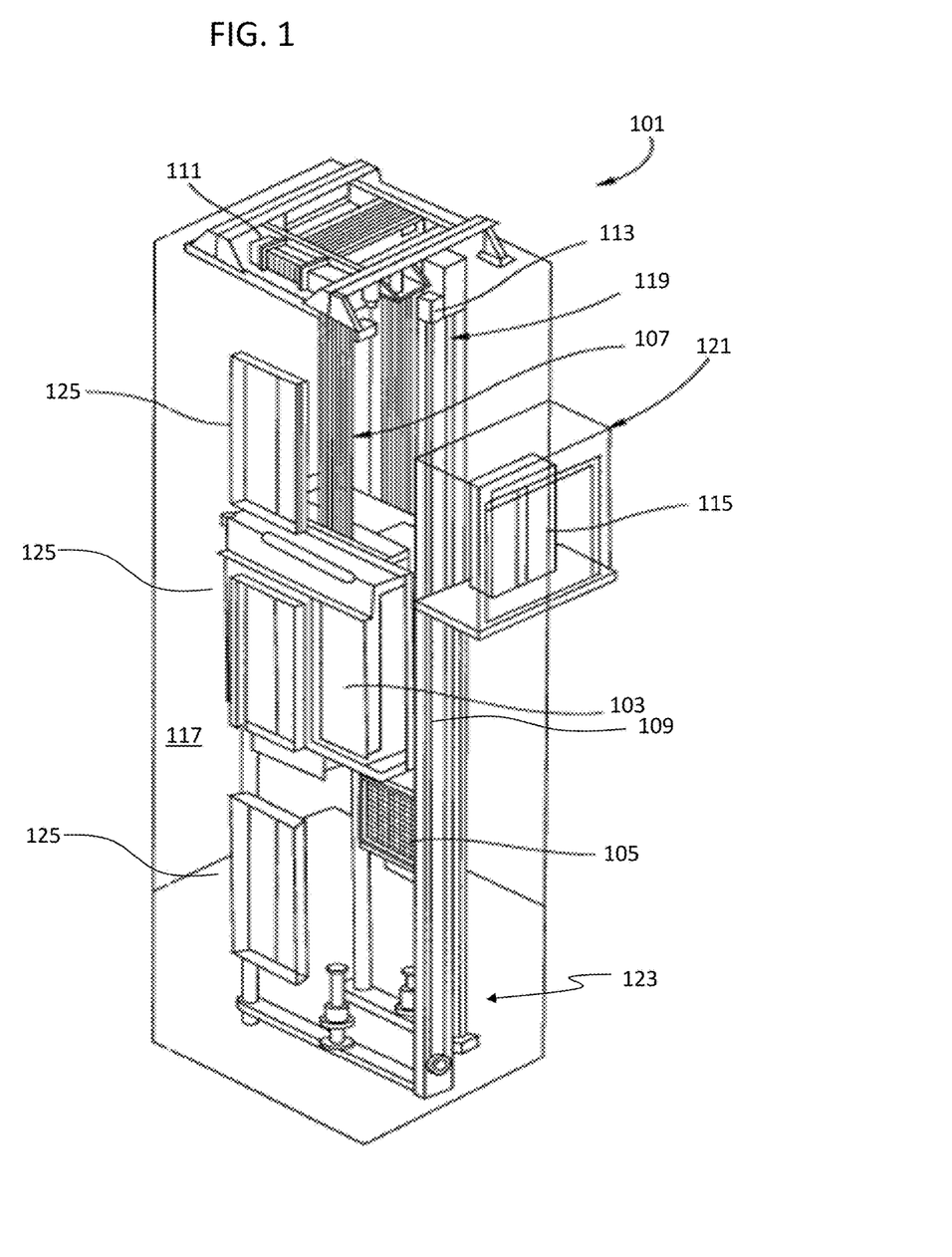
FIG. 1 is a schematic illustration of an elevator system that may employ various embodiments of the disclosure.

FIG. 1 is a perspective view of an elevator system 101 including an elevator car 103, a counterweight 105, a roping 107, a guide rail 109, a machine 111, a position encoder 113, and a controller 115. The elevator car 103 and the counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft may employ embodiments of the present disclosure. FIG. 1 is merely a non-limiting example presented for illustrative and explanatory purposes.

Various aspects and/or components of an elevator system may fail, wear, or otherwise have a fault or need to be replaced or fixed. Such maintenance generally requires a technician or other person to inspect the elevator system and the components thereof. However, due to staffing and/or time, the frequency with which technicians may get out to a specific elevator is limited. Accordingly, not all issues may be observed by a technician in a timely manner, and thus inspection, repair, or other action may be delayed. During such delay, the elevator may operate normally, but may also suffer from various minor issues. For example, one or more lights may be out or flickering in the elevator car, the braking system may generate noises that are abnormal, the paneling on the interior of the elevator car may be cracked, there may be a gap when the car is level with a landing door, the doors may make abnormal noises, there may be a broken mirror in the elevator car, etc. Generally, a technician must visit the elevator car, inspect the car, and make a determination that something needs to be fixed, replaced, repaired, etc. Alternatively, one solution to increase awareness of elevator technicians is to enable a passenger to call a phone number that is posted in or near the elevator car and/or elevator system (e.g., in a lobby area). However, having a passenger make a phone call may not be efficient because not all passengers may be willing to take the time to make a call or, more likely, a passenger may forget to call after leaving the elevator car.

As provided herein, embodiments of the present disclosure are provided to enable passengers of an elevator car to report an issue directly from the elevator car using a user-friendly interface that is accessible within the elevator car. For example, a user interface is provided on a screen within an elevator car and a user may interact with the user interface to generate a user report that can be transmitted to an operator, maintenance facility, or other remote location so that a technician can be notified of an issue with a specific elevator. The user report can include one or more issues or problems selected by a user related to the elevator car or elevator system.

Figure 2:
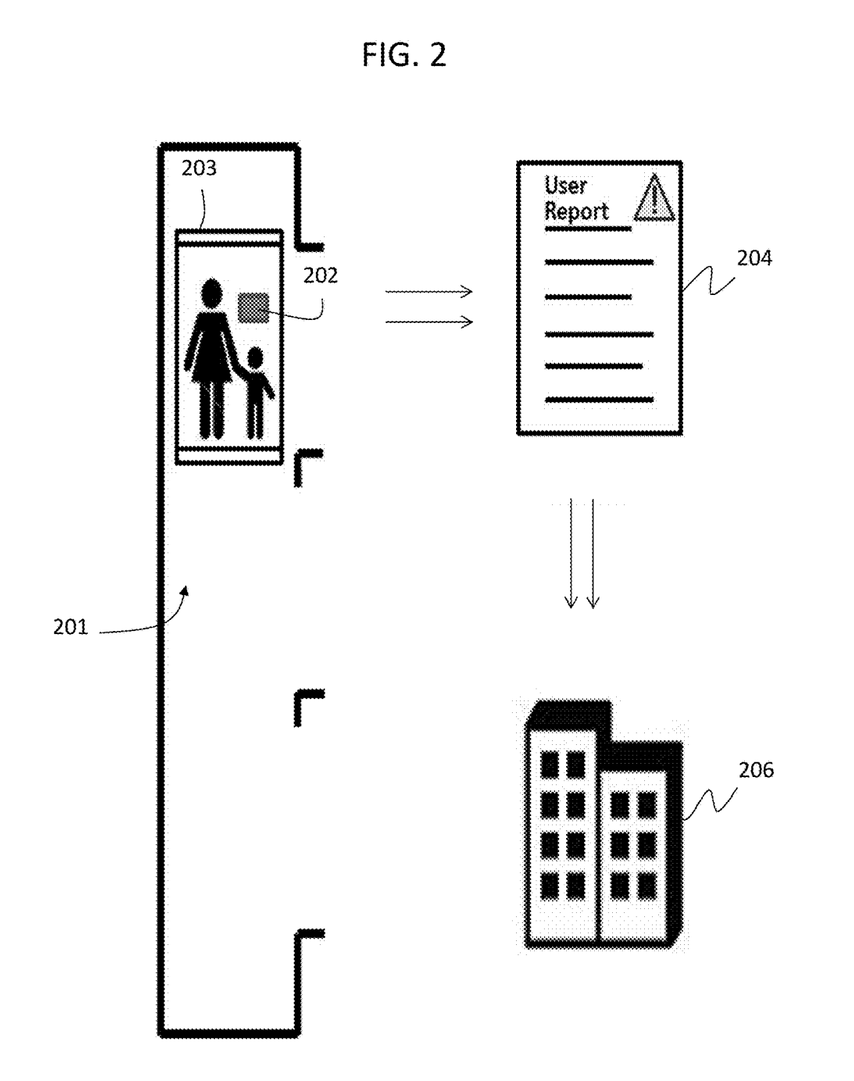
FIG. 2 is schematic illustration of an elevator system having a reporting system in accordance with an embodiment of the present disclosure.

Turning to FIG. 2, an elevator system 201 incorporating a reporting system in accordance with a non-limiting embodiment of the present disclosure is shown. The elevator system 201 includes an elevator car 203 and is configured substantially similar to the elevator system 101 of FIG. 1. Within the elevator car 203 is a reporting system 202. The reporting system 202 can include a digital or other visual display that is housed within a panel or subpanel of the elevator car 203. The reporting system 202 can further include one or more computers, processors, controllers, and/or other electronic components (see, e.g., FIG. 3). The reporting system 202 provides a user interface and display that is presented to a passenger within the elevator car 203.

If the passenger notices that there is something wrong with the elevator, such that maintenance may be required, the passenger can interact with the reporting system 202 to generate a user report 204 including one or more selected issues. The user report 204 can then be transmitted to a remote location 206 where the user report 204 can be analyzed and a technician can be dispatched to the particular elevator system 201 to perform inspection, repair, replacement, etc. as needed.

The reporting system 202 can present options, menus, and other interactive aspects to enable a passenger to easily generate a user report 204 that is accurate and representative of the issue that the passenger observes. For example, a passenger may interact with the user interface of the reporting system 202 to select that maintenance may be required. The display may then present a number of options (or a list) that the passenger can select from, wherein the list or options are categories of potential issues that may exist in the elevator system 201. The passenger may then navigate through the options and select a description of the issue they have observed. From this, the user report 204 will be generated including the selected one or more issues. The list of potential issues can include both maintenance related issues and non-maintenance related issues, and not just related to an elevator car. For example, issues may be related to landing doors (as compared to elevator car doors) or may be cosmetic in nature, such as a broken mirror, graffiti on a panel, etc.

The user report 204 will include report data that is transmitted to the remote location 206. The report data can include the passenger-selected issue (potentially including multiple issues), identification information specific to the elevator car (including but not limited to building information, elevator shaft number, car number, etc.), and date and time information of the user report 204. As noted, once generated, the user report 204 can be transmitted to the remote location 206. The remote location 206 can be a remote facility associated with the elevator manufacturer or with some other maintenance operation. In some embodiments, the remote location 206 may be the maintenance and/or operations office of the building in which the elevator is located. Thus, the remote location 206 is not limited to a separate facility, but rather refers to a source of maintenance for the elevator. Once the remote location 206 receives the user report 204, the remote location 206 can dispatch a technician to inspect the specific elevator and the technician can perform any necessary repairs, replacements, etc.

Figure 3:
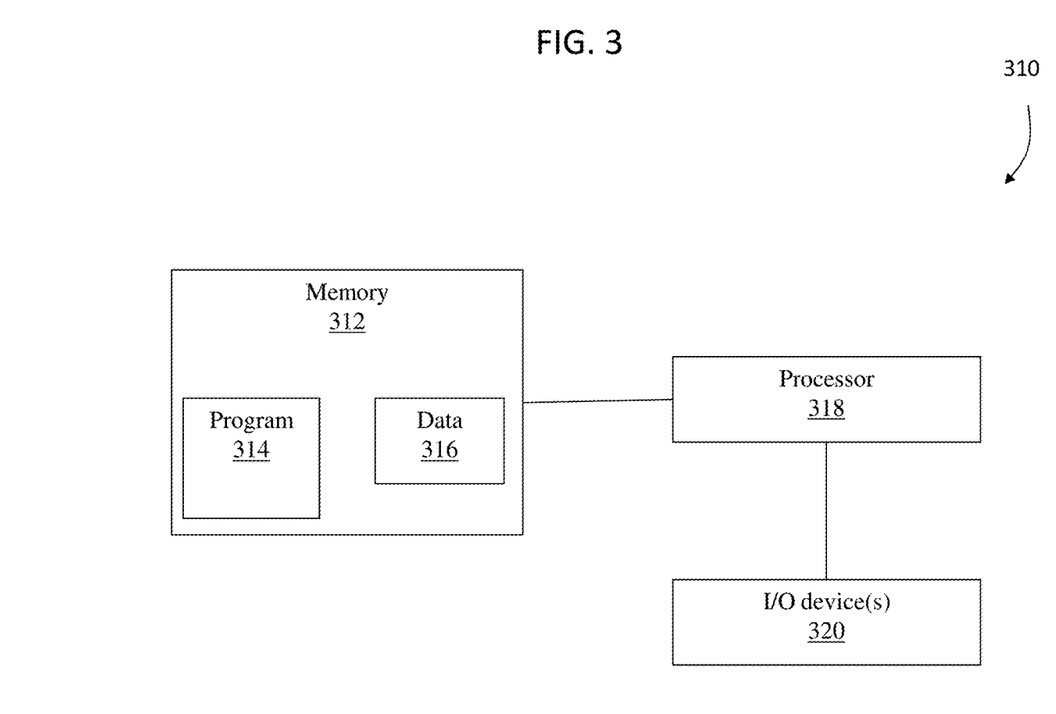
FIG. 3. is a schematic block diagram of a computing system in accordance with an embodiment of the present disclosure.

Referring now to FIG. 3, a computing system 310 that is configured for performing the computing functions of a reporting system in accordance with an embodiment of the present disclosure is shown. The computing system 310 may be configured as part of and/or in communication with an elevator controller, e.g., controller 115 shown in FIG. 1. The computing system 310 includes a memory 312 which may store executable instructions and/or data. The executable instructions may be stored or organized in any manner and at any level of abstraction, such as in connection with one or more applications, processes, routines, procedures, methods, etc. As an example, at least a portion of the instructions are shown in FIG. 3 as being associated with a program 314. The program 314 may be a program for providing a user interface and interactive program to perform the reporting processes described herein. Moreover, the program 314 can be configured to generate user reports and send such reports to a remote location.

Further, as noted, the memory 312 may store data 316. The data 316 may include elevator car data, device identifiers, lists of potential issues that may occur to the elevator system, and/or any other type(s) of data. The instructions stored in the memory 312 may be executed by one or more processors, such as a processor 318. The processor 318 may be operative on the data 316. The processor 318 may be a microprocessor or other computing or computational chip or component as known in the art.

The processor 318 may be coupled to one or more input/output (I/O) devices 320. In some embodiments, the I/O device(s) 320 may include one or more of a keyboard or keypad, a touchscreen or touch panel, a display screen, a microphone, a speaker, a mouse, a button, a remote control, a joystick, a printer, a telephone or mobile device (e.g., a smartphone), a sensor, etc. The I/O device(s) 320 may be configured to provide an interface to allow a user to interact with the computing system 310. For example, the I/O device(s) may support a graphical user interface (GUI).

The components of the computing system 310 may be operably and/or communicably connected by one or more buses. The computing system 310 may further include other features or components as known in the art. For example, the computing system 310 may include one or more transceivers and/or devices configured to receive and/or transmit information or data to and/or from sources external to the computing system 310. For example, in some embodiments, the computing system 310 may be configured to receive and/or transmit information over a network (wired or wireless). The information received over a network may be stored in the memory 312 (e.g. as data 316) and/or may be processed and/or employed by one or more programs or applications (e.g., program 314). The information transmitted over the network may include a passenger-generated user report, as described above.

The computing system 310 may be used to execute or perform embodiments and/or processes described herein. For example, the computing system 310, when configured as part of an elevator system, may be used to receive commands and/or instructions, and may further be configured to generate and transmit user reports related to potential issues associated with the elevator system in which the computing system 310 is part.

Figure 4A:
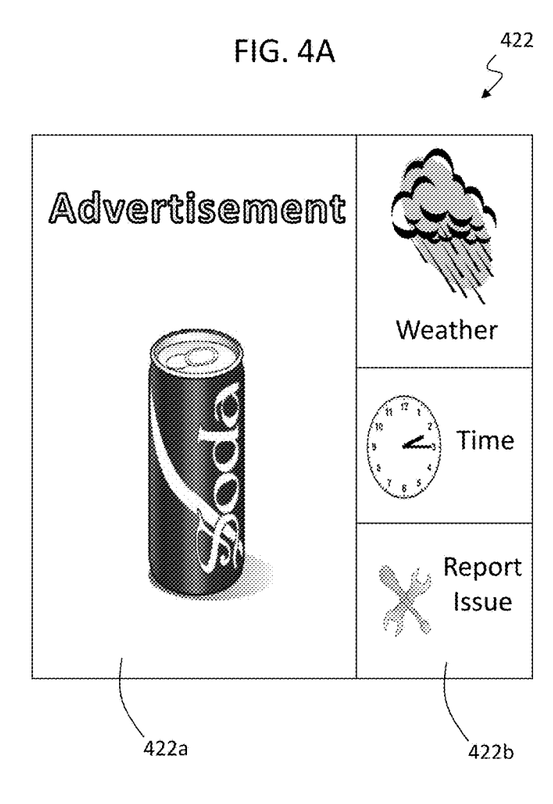
FIG. 4A is a schematic illustration of an elevator display user interface in a first state, in accordance with an embodiment of the present disclosure.
Figure 4B:
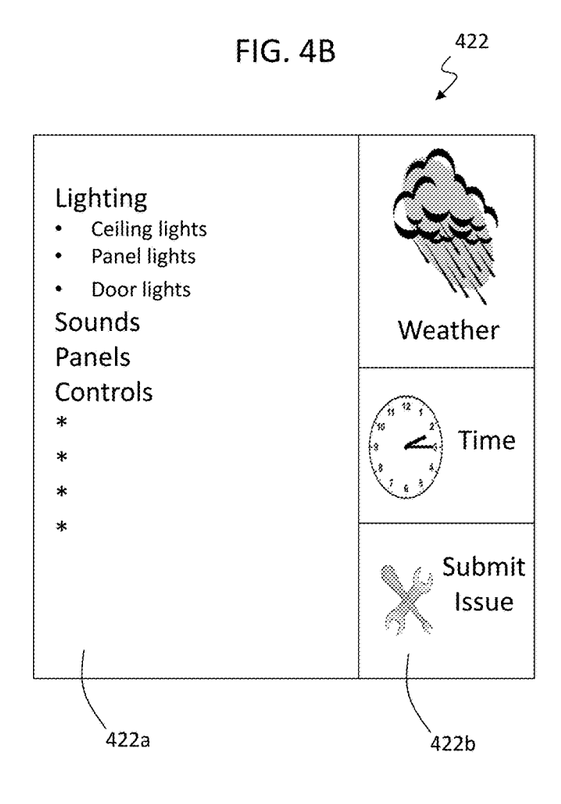
FIG. 4B is a schematic illustration of the display of FIG. 4A shown in a second state.

Turning now to FIGS. 4A-4B, various schematic illustrations of user interfaces in accordance with a non-limiting embodiment of the present disclosure are shown. FIG. 4A shows a first state of a user interface 422 and FIG. 4B shows a second state of the user interface 422.

As shown, in the first state shown in FIG. 4A, the user interface 422 includes a plurality of windows or screens. A first window 422a displays an advertisement or other image and/or video. A second window 422b displays an option for reporting an issue. The user interface 422 can include additional windows, such as shown, that provide additional information, including but not limited to, the weather, the time, etc. The user interface 422 can be a touch screen display that a passenger within an elevator car can interact with such that touching the screen will prompt alternative views and/or perform various functions.

For example, if a passenger observes an issue with the elevator car they are riding, the passenger can press the display in the area of the second window 422b labeled "Report Issue." Once the "Report Issue" is selected, the first window 422b will change and display various possible issues that can be reported. For example, as shown, a passenger can select from "lighting," "sounds," "panels," "controls," etc. If "lighting" is selected, a submenu of options is displayed. For example, as shown, the submenu under "lighting" includes possible lights that may be subject to issues, including "ceiling lights," "panel lights," and "door lights." Selection of one of these may then display further options related to the specific issues (e.g., blinking, out, discolored, etc.). Alternatively, selection of the type of light may be sufficient to generate a user report to be sent to a remote location, thus prompting dispatch of a technician to inspect the elevator lights.

The passenger may use the user interface 422 to select multiple issues in the first window 422a. Once the passenger is done with selecting issues, the passenger may generate a user report by selecting the second window 422b which now displays "Submit Issue." After selecting "submit issue," the windows of the user interface 422 can return to that shown in the first state (FIG. 4A).

Figure 5:
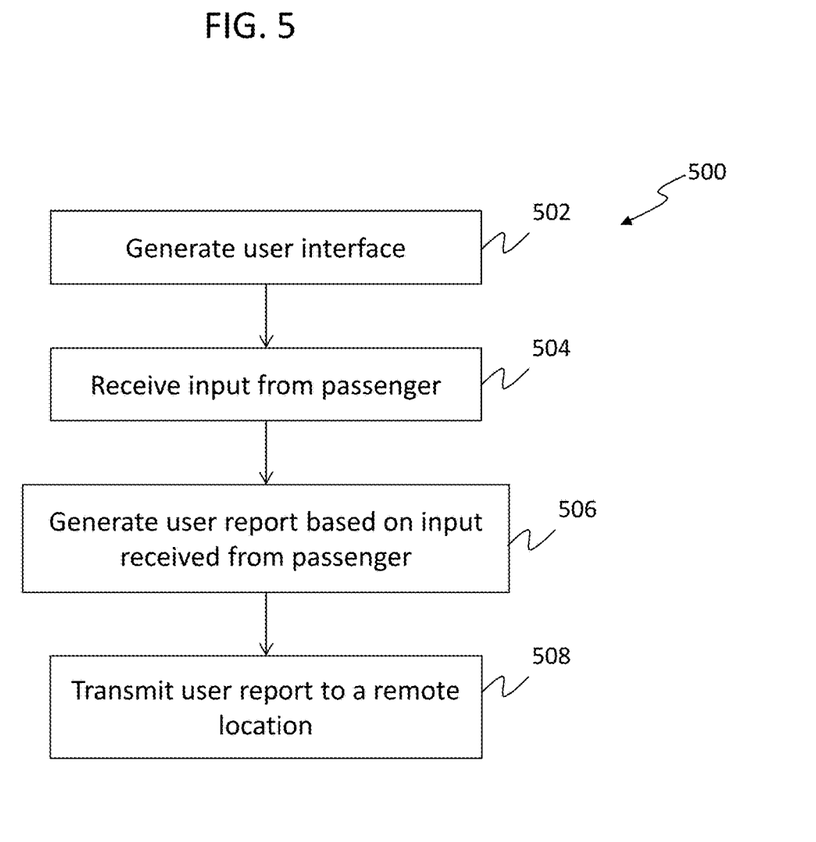
FIG. 5 is a flow process for generating a user report for submission of an observed issue with an elevator system in accordance with an embodiment of the present disclosure.

Turning now to FIG. 5, a flow process for reporting an issue with an elevator system in accordance with an embodiment of the present disclosure is shown. The flow process 500 may be performed with a system similar to that described above, or variations thereof. The system includes a display and interactive features within an elevator car that are configured to enable generation of user reports of issues related to the elevator car and/or the elevator system.

At block 502, the system displays a user interface on a display within the elevator car. The user interface can include a touch screen display or a display screen can be used in combination with the buttons of the elevator. For example, the user interface may be a display or screen and the car operating buttons can be used to navigate through the user interface and options presented thereon.

At block 504, the system receives input from a passenger within the elevator car. The input may be selected from information that is stored on the system. For example, when a passenger starts interacting with the user interface, various information may be displayed related to the elevator system, including possible options that may be subject to one or more issues. The passenger can select from the displayed information and the system will receive the selected information as a user input.

At block 506, the system will use the user input received from the passenger to generate a user report. The system may further include additional information in the user report. For example, in addition to including the selected information by the passenger, the user report may include system information including identification of the elevator car, the date, and the time of the report.

At block 508, the system will transmit the generated user report to a remote location. The remote location, in response to the report, may dispatch a technician to perform maintenance on the elevator car.

Although described herein using a user interface wherein a passenger inputs information into the system, various other configurations are possible. For example, rather than have a passenger press buttons or use a touch-screen display, the system may respond to verbal or auditory commands. As such, a user may use voice commands to generate the user report and submit the issue to a remote location to have the issue addressed.

Further, various checks or criteria may be used to prevent false reports from being generated. For example, in some embodiments, the elevator system may not generate a user report immediately. In such embodiments, the reporting system may save or store the information. The system can track the number of times passengers make a report in the elevator and track what issues are reported. If a specific issue is reported a predefined number of times within a predefined period of time, the user report may be generated and sent to the remote location. In another configuration, each submission by a passenger will generate a report and it will be sent, but the remote location can filter the reports such that the number of reports at a specific elevator can be tracked for similar predefined criteria (e.g., number, duration, etc.).

The system may further be configured to filter certain passenger submissions. For example, based on the time of day, the system may filter out passenger submissions, or can weight them with higher or lower importance.

In some embodiments, the system may be configured to determine if a report (e.g., generated or submitted by a passenger or user) is relevant. For example, the system may check the reported issue against other available information. The other available information may include time of day, day of week, number of total issues submitted within a predefined period of time (e.g., a passenger tries to submit every issue within a single elevator ride), number of times the particular issue has been submitted, frequency of submissions, the closeness or relation of various issues submitted (e.g., all reports are related to lighting), etc.

Advantageously, embodiments provided herein enable easy passenger submission of issues related to an elevator car and/or operation thereof. As discussed, various embodiments enable prompting (e.g., display and interactive user interface) and various options related to issues for a passenger to select from and submit related to an elevator car the passenger is riding. Advantageously, maintenance costs may be reduced and/or elevator maintenance may be made more efficient by making it easy for passengers to report specific issues that may require attention by a technician. A technician may know the specific issue of the elevator car prior to making a service call, thus improving maintenance efficiency. Further, early signs of major maintenance may be observed by passengers and reports can be made thereon, thus enabling an early notification of issues (e.g., related to observed noises in the elevator car during operation).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A reporting system for an elevator system, the reporting system comprising:
a display located within an elevator car;
an input device configured to receive input from a passenger within the elevator car; and
a computing system having a processor and a memory, the computing system configured to generate a user interface on the display and configured to receive input from the input device, wherein the memory includes a list of possible issues related to the elevator system,
wherein the computing system is configured to:

generate a user report based on the received input, wherein the user report includes at least one selected issue and information related to the elevator car;

determine if the generated user report is relevant, wherein the user report is relevant when the user report meets at least one predefined criteria, and the at least one predefined criteria comprises a number of similar user reports; and transmit the user reports reporting the same issue to a remote location only when it is determined that the user report is relevant.

2. The reporting system of claim 1, wherein the display and the input device are a single device that is a touchscreen display.

3. The reporting system of claim 1, wherein the input device is the control buttons of the elevator car.

4. The reporting system of claim 1, wherein the input device is a microphone configured to receive voice commands from the passenger.

5. The reporting system of claim 1, wherein the at least one predefined criteria further comprises at least one of a time of day and a day of the week.

6. A method of reporting an issue with an elevator, the method comprising:

generating a user interface within an elevator car;

displaying one or more possible issues on the user interface to be selected by a passenger in the elevator car;

receiving input through an input device within the elevator car, the input including at least one of the one or more possible issues;

generating a user report based on the received input, wherein the user report includes information related to the input and information related to the elevator car;

storing said user report in a memory;

comparing the generated user report to criteria to determine if the generated user report is relevant, wherein the criteria comprises at least a number of similar user report; and transmitting the user report to a remote location when the user report is determined to be relevant.

7. The method of claim 6, wherein the user interface and the input device are a single device.

8. The method of claim 6, wherein the user report is relevant if (i) the user report is generated during a predefined period during a day, (ii) the user report is generated during a specific day of the week, or (iii) the user report matches at least one other user report generated during a predetermined period of time.

* * * * *